Jan. 27, 1942.   J. E. DOESCHER   2,270,938
FILTER
Filed Aug. 29, 1938   2 Sheets-Sheet 1
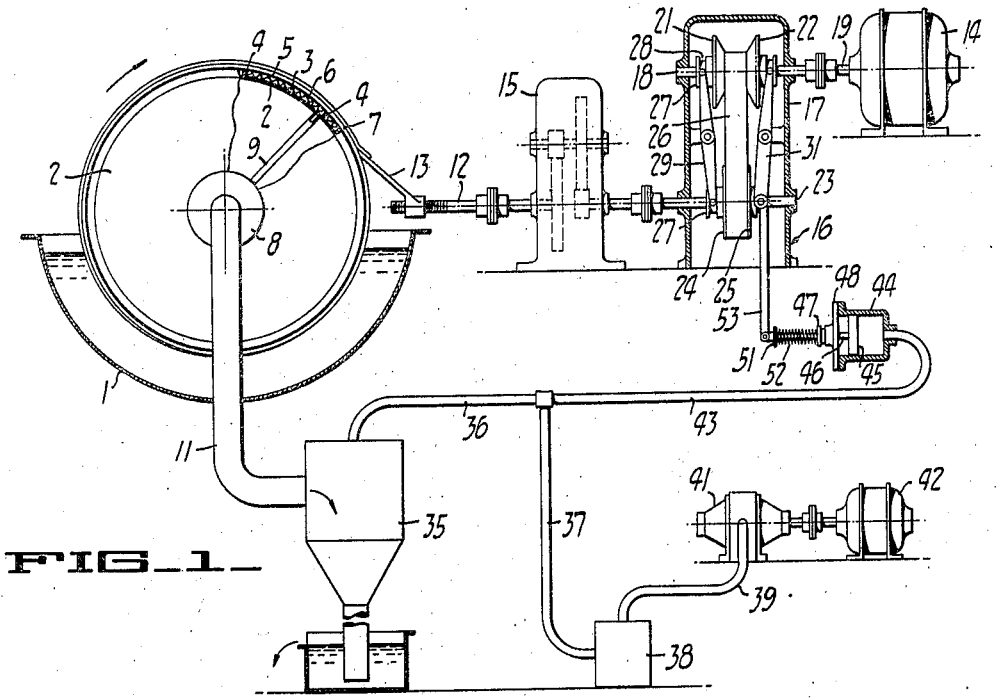
FIG_1_
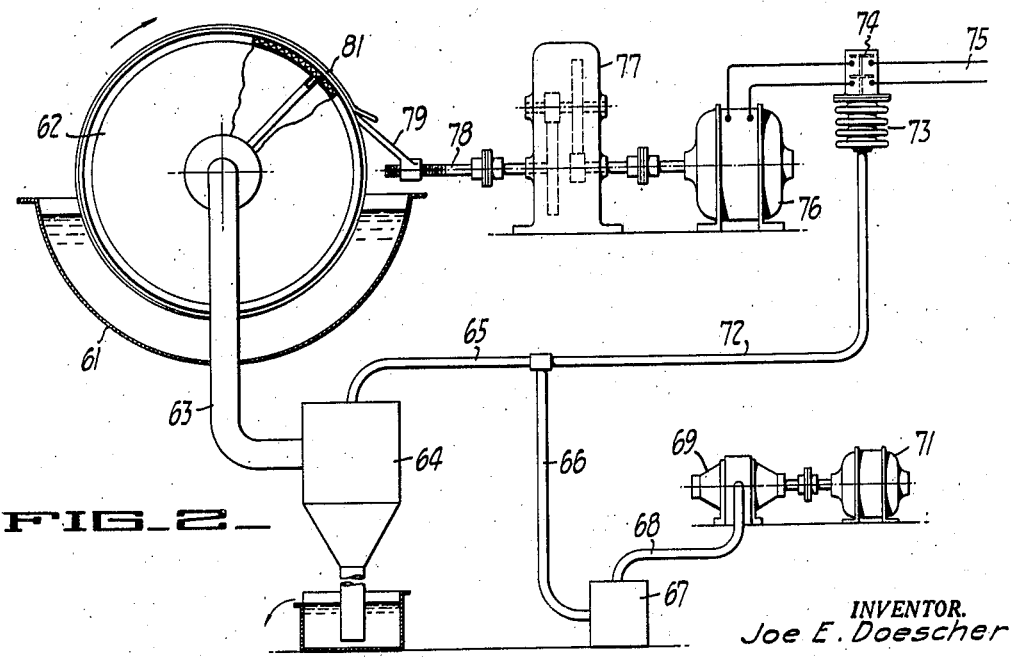
FIG_2_
INVENTOR.
Joe E. Doescher
BY
ATTORNEY Jan. 27, 1942.    J. E. DOESCHER    2,270,938
FILTER
Filed Aug. 29, 1938    2 Sheets-Sheet 2
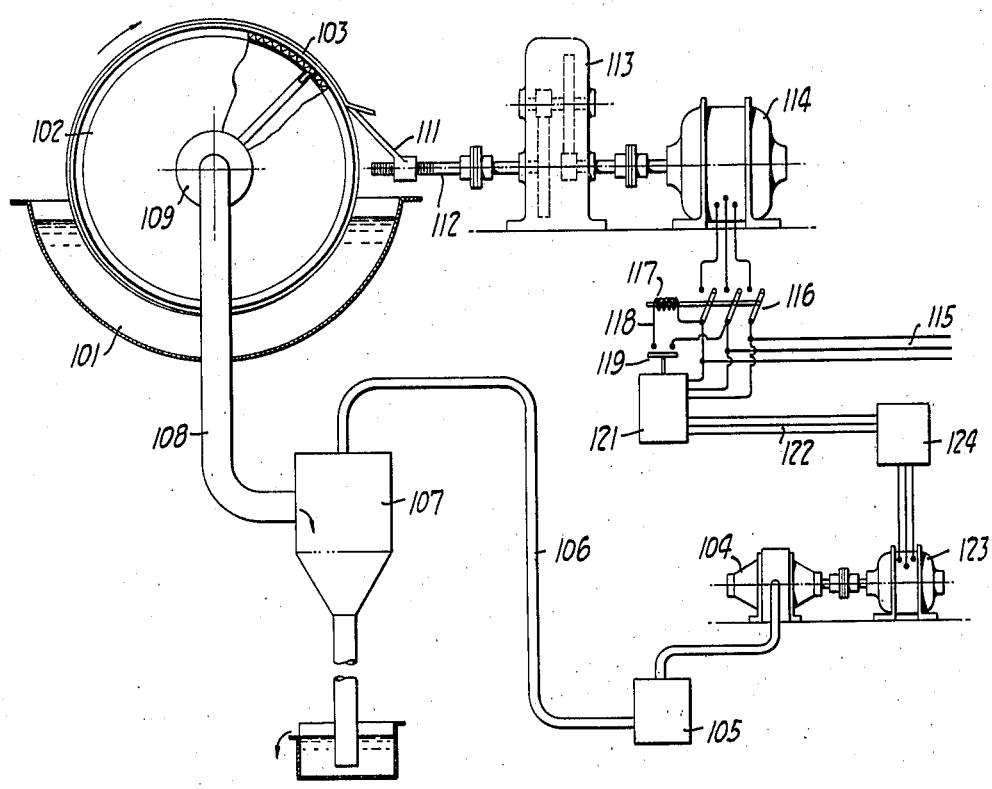
FIG_2_
INVENTOR.
Joe E. Doescher
BY
ATTORNEY Patented Jan. 27, 1942

2,270,938

UNITED STATES PATENT OFFICE 2,270,938

FILTER

Joe E. Doescher, Attleboro, Mass., assignor to Oliver United Filters Incorporated, San Francisco, Calif., a corporation of Nevada Application August 29, 1938, Serial No. 227,268

4 Claims. (Cl. 210—201)

This invention relates in general to filters and more particularly to automatic means for controlling the advance of the knife of a continuous precoat filter such as shown in the Wieneke U. S. Patent No. 2,083,887.

The Wieneke patent shows in general a continuous rotary drum vacuum filter wherein the filter medium consists of a precoat or preformed layer of finely divided filtering material such as diatomaceous earth. In order to maintain a fresh filtering surface, a knife is made to advance continuously into the layer of precoat material for the purpose of shaving off the cake picked up on the precoat, as well as a very thin film of the precoat itself.

Filtration is always effected by means of imposing a differential filtering pressure between the exterior and interior of the filter medium either by applying a super-atmospheric pressure about the outer surface of the filter medium or by subjecting the interior of the filter to sub-atmospheric pressure. The pressure differential between the two sides of the filter medium depends not only upon the degree of pressure applied by means of either a vacuum pump or pressure pump, but also upon the porosity of the filter medium. Obviously, if the filter medium becomes clogged to such an extent that no fluid can pass therethrough, the pressure differential between the two sides of the filter medium will be increased. If the differential filtering pressure is obtained by subjecting the interior of the filter to sub-atmospheric pressure, a vacuum gauge on the vacuum line will indicate fairly accurately the condition of the filter medium, that is, its degree of porosity.

In general, the object of my invention is the provision, in combination with a precoat filter, of means responsive to variations in the differential filtering pressure for controlling the advance of the knife used to shave off the cake formed on the precoat, together with a film of the precoat, so that a fresh filtering surface is always presented to the material being filtered.

The invention possesses other advantageous features, some of which with the foregoing will be set forth at length in the following description where those forms of the invention which have been selected for illustration in the drawings accompanying and forming a part of the present specification are outlined in full. In said drawings, three forms of the invention are shown, but it is to be understood that it is not limited to such forms, since the invention as set forth in the claims may be embodied in a plurality of forms.

Referring to the drawings:

Figure 1 is a diagrammatic representation of a continuous rotary drum precoat filter provided with means responsive to variations in the differential filtering pressure for controlling the rate at which the discharge knife is advanced into the precoat.

Figure 2 is a diagrammatic representation of a precoat filter wherein the circuit to the motor operating the discharge knife is opened and closed in response to predetermined variations in the differential filtering pressure.

Figure 3 is a diagrammatic illustration of a precoat filter provided with means for opening and closing the motor circuit operating the discharge knife in response to variations in the power input to the motor operating the vacuum pump.

As shown in Figure 1, the objects of my invention may be embodied in combination with a precoat filter comprising a pulp or slurry tank 1 in which is arranged to rotate a drum 2 provided on its surface with a plurality of independent filtrate compartments or cells 3 defined by spaced division strips 4. The outer surface of the compartments 3 is covered with a filter fabric 5, held in spaced relation with respect to the drum 2 by drainage members 6. Formed on the filter fabric 5 is a layer 7 of diatomaceous earth or other comminuted filtering material. It should be noted that in a precoat type of filter it is not necessary that the drum be divided into a plurality of independent filtrate compartments or cells 3, for a single filtrate compartment surrounding the drum, as shown in the Wieneke patent, may under most conditions answer the purpose.

Associated with one of the drum trunnions is an automatic valve 8 which by means of piping 9 establishes communication between each of the filtrate compartments 3 and a filtrate pipe 11.

Mounted adjacent the discharge side of the drum 2 on a screw 12 is a scraper 13. Rotation of the screw 12 is effected by a motor 14 through a speed reducer 15 and an adjustable speed transmission 16. The speed reducer may be of any well known construction. The adjustable speed transmission 16 has been shown as being of the Reeves type, and consists of a frame 17 in the upper end of which is journaled a shaft 18 coupled to the shaft 19 of the motor 14. Keyed to the shaft 18 but longitudinally movable with respect thereto, is a pair of frusto-conical members 21 and 22 which together form an adjustable sheave. Journaled in the lower end of the frame 17 is a shaft 23 to which is keyed a pair of frusto-conical members 24 and 25, which together form an adjustable sheave. Passing around the adjustable sheaves formed by the members 21 and 22, 24 and 25, is a transmission belt 26. Secured to each of the members 21, 22, 24, and 25 is a collar 27 provided with a channel 28 adapted to receive the bifurcated ends of levers 29 and 31 fulcrumed to the frame 17 intermediate the shafts 18 and 23. From this construction it will be seen that a divergence of the lower ends of the levers 29 and 31 will cause the members 21 and 22 to converge and the members 24 and 25 to diverge, thereby changing the speed ratio between the shafts 18 and 23.

The filtrate pipe 11 communicates with a vacuum receiver 35 and through piping 36 and 37, a moisture trap 38, and piping 39, with a vacuum pump 41 driven by a motor 42. Communicating with the piping 36 and 37 through piping 43 is a cylinder 44, and operating in this cylinder is a piston 45 provided with a stem 46 passing through a stuffing box 47 formed on the cover 48 of the cylinder 44. Interposed between the stuffing box 47 and a collar 51 secured to the outer end of the stem 46 is a coil spring 52 which serves to urge the piston 45 in its extended position. The movement of the piston 45 is transmitted to the levers 29 and 31 by an arm 53 formed as an extension of the lever 31.

The operation of the device as above described is as follows:

The layer 7 of precoat material is formed on the filter fabric 5 in the usual manner and the tank 1 filled with pulp or slurry to be filtered. The drum 2 is then slowly rotated and subjected to a differential filtering pressure by the vacuum pump 41. As the drum 2 rotates, the knife 13 is slowly advanced into the layer 7 of precoat material by the motor 14, for the purpose of cutting off the cake deposited on the precoat material as the result of the filtration operation and also a film of the precoat material itself, to thereby continually present a fresh filtering surface to the material being filtered. If for any reason the advance of the scraper 13 is insufficient to cut off the plugged outer surface of the precoat material, the vacuum within the receiver 35 and consequently the piping 36 and 43, will be increased and the point will be reached wherein this increase in vacuum will be sufficient to draw the piston 45 inwardly. This inward motion of the piston 45 will cause the members 21 and 22 to converge and the members 24 and 25 to diverge, and consequently the shaft 12 will rotate at a higher speed and the knife 13 will advance more rapidly into the precoat material. When the knife 13 has advanced sufficiently to shave off the outer clogged film of the precoat material, a certain amount of air will pass through the precoat material, thereby reducing the vacuum in the system. The reduction of vacuum in the system will cause the piston 45 to travel to the left and thereby reduce the speed at which the knife 13 is advanced into the precoat material.

It will therefore be seen that the above system provides a means whereby the advance of the knife 13 is made continuously responsive to variations in the differential filtering pressure.

In Figure 2 I have disclosed a system wherein the scraper of the precoat filter is intermittently advanced through the intermittent operation of the motor which drives it and which in turn is intermittently controlled by variations in the differential filtering pressure to which the filter is subjected. This system comprises a tank 61 within which is made to rotate a drum 62 of the same general construction as the drum 2 shown in Figure 1. The exterior and interior of the drum are subjected to a differential filtering pressure by a filtrate pipe 63 communicating through a vacuum receiver 64, piping 65 and 66, a moisture trap 67, and piping 68 with a vacuum pump 69 driven by a motor 71. The piping 65 and 66 communicates by piping 72 with a Sylphon 73, which serves to open and close a switch 74 across the input 75 of a motor 76. The motor 76 through a speed reducer 77 serves to rotate a screw 78 which in turn advances a scraper 79 located adjacent the discharge side of the drum 62 in the path of the layer of precoat material 81 formed thereon.

It will be seen that if, in a system as above described, the precoat material 81 becomes clogged, the vacuum in the system will be increased and upon reaching a predetermined point will be sufficient, through the operation of the Sylphon 73, to close the switch 74 of the motor 76. The operation of the motor 76 will cause the knife 79 to advance into the layer 81 of precoat material, until its clogged outer surface has been shaved off and air is permitted to pass through it. Upon the passage of air through the precoat material the vacuum in the system will be reduced, thereby causing the Sylphon 73 to open the switch 74.

In the system shown in Figure 3, the switch of the motor operating the knife has been made responsive to variations in the input to the motor operating the vacuum pump. As shown in this figure, the system comprises a pulp or slurry tank 101 within which is made to rotate a filter drum 102 provided on its outer surface with a preformed layer 103 of diatomaceous earth or other filtering material. A differential pressure is established between the exterior and interior of the drum by a vacuum pump 104 operating through a moisture trap 105, piping 106, vacuum receiver 107, filtrate pipe 108, and an automatic valve 109. Adjacent the discharge side of the drum 102 is a scraper 111 advanced by a screw 112 operated through a speed reducer 113 by a motor 114. Across the input 115 of the motor 114 is a switch 116 operated by a solenoid 117. The solenoid circuit 118 is arranged to be closed by a switch 119 operated by a power actuated relay 121 in circuit with the input 122 of the motor 123 driving the vacuum pump 104. If desired, an auxiliary switch 124 may be placed between the power actuated relay 121 and the motor 123.

In a system such as this, a plugging of the layer 103 of precoat material will cause an increase in the load placed on the motor 123 and any changes in the load on the motor 123 will of course be reflected in its power input. Since the relay 121 is made responsive to any such fluctuations, the switch 116 may be opened and closed upon variations, within predetermined limits, in the power input to the motor 123. When the switch 116 is closed and the motor 114 thereby put into operation, the knife 111 will be advanced until a sufficient amount of the layer of precoat has been shaved off to permit the passage of air therethrough.

In each of the three systems shown in Figures 1, 2, and 3, the operation of the knife may be considered as being responsive to variations in the porosity of the precoat material as reflected by variations in the differential filtering pressure. In the systems shown in Figures 1 and 2, the operation of the knives 13 and 79 is made directly responsive to variations in the differential filtering pressure or vacuum system, while in the system shown in Figure 3, the operation of the knife 111 is controlled indirectly by variations in the vacuum system as reflected in the input to the motor 123 operating the vacuum pump 104.

For the purposes of this specification and the claims appended hereto, the term "filter cell" is used in its broad sense to designate any filter unit, whether it be one of the independent filtrate compartments of any continuous type of filter or whether it be an isolated and complete unit of itself. In the rotary drum filters diagrammatically shown in Figures 1, 2, and 3, the drums rotate with respect to a stationary knife, but obviously the same result may be obtained by causing the knife to move across the face of a stationary filter unit. All that is required is relative motion between these two members.

The term "knife" is to be given a broad construction to designate either a straight edged knife as shown in the drawings, a knife of helical form such as shown in Figure 4 of the Wieneke patent, a brush, or any other form of cutting device.

Although normally the knife is made to advance toward the filter, all that is required is relative movement of these two members, and consequently the same result can be obtained by continuously or successively moving the filter toward the knife. In the appended claims, movement of the cutting means toward the filter cell or unit is to be broadly construed only as relative movement of these elements.

I claim:

1. A filter comprising a receptacle for solids bearing liquid to be filtered; a porous filter cell adapted to support a layer of comminuted filtering material on its outer surface; means for creating a differential filtering pressure between the exterior and the interior of said cell to cause the liquid to pass through the surface of the filter and the solids to deposit on the outer surface of the filtering material as a filter cake; means for mounting said cell in position to be at least partially submerged in the solids bearing liquid; a knife adapted to remove a portion of the filtering material and the filter cake from the surface of said cell; means for mounting said knife for movement toward and away from said cell in a direction substantially perpendicular to the outer surface of said cell and into the filtering material thereon; means for moving said knife toward the surface of said cell and into the filtering material thereon; means for moving said filter cell and knife, one with respect to the other in a direction substantially parallel to the outer surface of said cell and means responsive to variations in said differential filtering pressure to control the said means for moving the knife toward the surface of the cell.

2. A filter cell adapted to carry a precoat, and a precoat knife arranged for relative movement over each other in a direction substantially parallel to the surface of the filter cell; means for effecting said relative movement between said filter cell and precoat knife; means for delivering material to be filtered to said filter cell; means for subjecting said cell to a differential filtering pressure; a motor for effecting relative movement of said filter cell and precoat knife toward each other; and means responsive to variations in said differential filtering pressure for controlling the operation of said motor.

3. A filter cell adapted to carry a precoat, and a precoat knife arranged for relative movement over each other in a direction substantially parallel to the surface of the filter cell; means for effecting said relative movement between said filter cell and said precoat knife; means for delivering material to be filtered to said filter cell; a vacuum receiver communicating with said filter cell; a motor associated with said precoat knife for advancing said precoat knife into said precoat; and means responsive to variations in the pressure in said vacuum receiver for controlling the operation of said motor.

4. A filter comprising: a tank; a filter drum in said tank, means to rotate said drum; a filter cell formed on the surface of said filter drum and arranged to carry a layer of precoat material; a vacuum receiver communicating with said filter cell; a precoat knife mounted on said tank across the face of said drum for movement to and from said drum; a motor for advancing said precoat knife into said precoat; and means responsive to variations in the pressure in said vacuum receiver for controlling the operation of said motor.

JOE E. DOESCHER.